(12) United States Patent
Oqab et al.

(10) Patent No.: US 12,208,927 B2
(45) Date of Patent: Jan. 28, 2025

(54) SYSTEMS AND METHODS FOR CONTROLLING A TARGET SATELLITE

(71) Applicant: OQAB DIETRICH INDUCTION INC., Kitchener (CA)

(72) Inventors: Haroon B. Oqab, Kitchener (CA); George B. Dietrich, Kitchener (CA)

(73) Assignee: Oqab Dietrich Induction Inc., Kitchener (CA)

( * ) Notice: Subject to any disclaimer, the term of this patent is extended or adjusted under 35 U.S.C. 154(b) by 256 days.

(21) Appl. No.: 17/434,617

(22) PCT Filed: Feb. 28, 2020

(86) PCT No.: PCT/IB2020/051730
§ 371 (c)(1),
(2) Date: Aug. 27, 2021

(87) PCT Pub. No.: WO2020/174453
PCT Pub. Date: Sep. 3, 2020

(65) Prior Publication Data
US 2022/0169404 A1  Jun. 2, 2022

Related U.S. Application Data

(60) Provisional application No. 62/811,940, filed on Feb. 28, 2019.

(51) Int. Cl.
*B64G 1/64* (2006.01)
*B64G 1/10* (2006.01)
(Continued)

(52) U.S. Cl.
CPC ........... *B64G 1/242* (2013.01); *B64G 1/1078* (2013.01); *B64G 1/62* (2013.01); *B64G 1/646* (2013.01);
(Continued)

(58) Field of Classification Search
CPC ....... B64G 1/242; B64G 1/1078; B64G 1/646
See application file for complete search history.

(56) References Cited

U.S. PATENT DOCUMENTS

2002/0179775 A1* 12/2002 Turner .................... B64G 1/402
244/172.5
2003/0098394 A1*  5/2003 Cooper ................... B64G 1/646
244/166
(Continued)

FOREIGN PATENT DOCUMENTS

EP      1731424 A1    12/2006
EP      3112274 A1 *  1/2017  ........... B64G 1/1078
(Continued)

OTHER PUBLICATIONS

European Search report from corresponding EP application No. 20762880.1, dated May 22, 2024.

*Primary Examiner* — Tye William Abell
(74) *Attorney, Agent, or Firm* — Own Innovation; James W. Hinton

(57) ABSTRACT

An example system for controlling a target satellite includes: a satellite-control spacecraft including: a propulsion subsystem configured to propel and navigate the spacecraft proximate the target satellite; and a satellite-capture subsystem configured to: capture the target satellite; apply a control medium to the target satellite, the control medium including an electrically conducting and/or magnetic material; and release the target satellite; and an energization assembly configured to energize the control medium to release energy for controlling, propelling and navigating the target satellite.

25 Claims, 10 Drawing Sheets

(51) Int. Cl.
  *B64G 1/24*    (2006.01)
  *B64G 1/62*    (2006.01)
  *B64G 4/00*    (2006.01)

(52) U.S. Cl.
  CPC .......... *B64G 4/00* (2013.01); *B64G 2004/005* (2013.01)

(56) References Cited

U.S. PATENT DOCUMENTS

| | | | |
|---|---|---|---|
| 2007/0044450 A1* | 3/2007 | Kuninaka | B64G 1/403 60/200.1 |
| 2008/0142639 A1 | 6/2008 | Jallade | |
| 2009/0164055 A1* | 6/2009 | Kosmas | B64G 1/36 701/3 |
| 2014/0013982 A1 | 1/2014 | Meir et al. | |
| 2017/0015444 A1* | 1/2017 | Okada | B64G 1/242 |

FOREIGN PATENT DOCUMENTS

| | | |
|---|---|---|
| EP | 3127822 A1 | 2/2017 |
| FR | 3038297 A1 | 1/2017 |
| JP | 2000025699 A | 1/2000 |
| JP | 2004098959 A | 4/2004 |
| JP | 2016002813 A | 1/2016 |
| JP | 2016128285 A | 7/2016 |

* cited by examiner

SYSTEMS AND METHODS FOR CONTROLLING A TARGET SATELLITE

FIELD

The specification relates generally to systems for in-space operations, and more particularly to systems and methods for controlling and providing motility to a target satellite in space.

BACKGROUND

Satellites generally orbit the earth in a regularly repeating trajectory. Once in orbit, satellites tend to maintain their flight path. Once a satellite has completed its purpose or runs out of fuel, they are often decommissioned to a higher orbit and left to remain in orbit, as unusable rubbish or debris. As such debris accumulates, chances of collisions with other satellites, spent rockets, and satellite fragments increase, larger amounts may impede the function of active satellites.

SUMMARY

According to an aspect of the present specification, a system for controlling a target satellite is provided. The system includes: a satellite-control spacecraft including: a propulsion subsystem configured to propel and navigate the spacecraft proximate the target satellite; and a satellite-capture subsystem configured to: capture the target satellite; apply a control medium to the target satellite, the control medium including an electrically conducting and/or magnetic material; and release the target satellite; and an energization assembly configured to energize the control medium to release energy for controlling the target satellite.

According to another aspect of the present specification, a method of controlling a target satellite is provided. The method includes: capturing, by a satellite-control spacecraft, the target satellite; applying, by the satellite-control spacecraft, a control medium to the target satellite, the control medium including an electrically conducting and/or magnetic material; releasing, by the satellite-control spacecraft, the target satellite; and energizing, by an energization assembly, the control medium to release energy for controlling the target satellite.

According to another aspect of the present specification, another method of controlling a target satellite is provided. The method includes: pre-applying a control medium to the target satellite; launching the target satellite; and energizing, by an energization assembly, the control medium to release energy for controlling the target satellite.

BRIEF DESCRIPTION OF DRAWINGS

Implementations are described with reference to the following figures, in which.

DETAILED DESCRIPTION

The present disclosure provides systems and methods for controlling and providing motility to a target satellite in space. In particular, the systems and methods disclosed herein allow for servicing and/or positioning relative to other satellites in orbit, including removing debris, orbital maneuvering, gaining control of an uncontrolled object, affixing satellites and/or satellite fragments together and controlling attitude of spacecraft. Specifically, electrically conducting and/or magnetic materials, such as reactive metal compounds in different combinations and spatial configurations, may be applied, in the form of a control medium, to the target satellite. The electrically conducting and/or magnetic materials may then be combusted and/or sintered, for example via induction, or remotely via sunlight, laser, or microwave energy or other electromagnetic radiation. The ignition profile of the control medium may be specifically selected such that, upon ignition, the target satellite is controlled in a specific manner, for example, to de-orbit the target satellite, move the target satellite to a pre-designated area, join to other satellites and/or objects, or alter the orbit of the target satellite.

Figure 1:
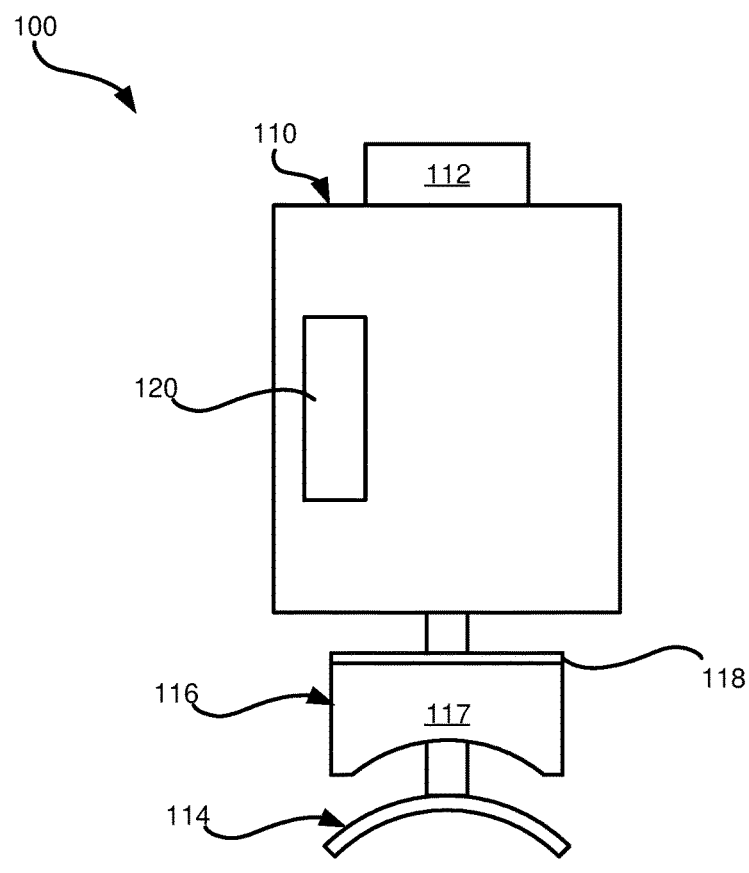
FIG. 1 depicts a schematic of a satellite-control spacecraft for controlling and providing motility a target satellite in space.
Figure 1:
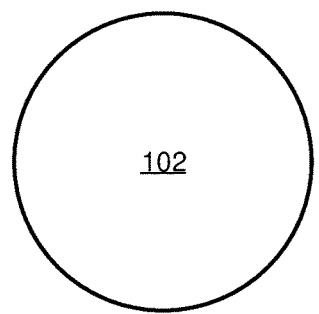

FIG. 1 depicts an example system 100 for controlling a target satellite 102 in space. The target satellite 102 may be, for example, an active satellite (e.g., for monitoring, data capture or the like), debris, or another object in orbit. The system 100 includes a satellite-control spacecraft 110. The satellite-control spacecraft 110 (also referred to herein as simply the spacecraft 110) is generally configured to perform a control operation to control the target satellite 102. For example, the control operation may be to alter the orbit of the target satellite 102, to de-orbit the target satellite 102, or to move the target satellite 102 to a pre-designated area. The spacecraft 110 may comprise metals, metal alloys, composite materials, and the like suitable for containing and protecting the internal components of the spacecraft 110 in space.

The spacecraft 110 includes a propulsion subsystem 112 configured to propel and navigate the spacecraft proximate the target satellite 102. For example, the propulsion subsystem 112 can include propulsion components such as, but not limited to, engines, rockets, motors, or the like for propelling the spacecraft 110. The propulsion subsystem 112 can also include navigation components such as sensors, beacons, localization modules, and the like for navigating the spacecraft 110 in space. Further, the propulsion subsystem 112 may include a controller to control the propulsion components, the navigation components, and any other components of the propulsion subsystem 112.

The propulsion subsystem 112 is generally configured to detect the target satellite 102 and orient the spacecraft proximate the target satellite. For example, the navigation components may detect the target satellite 102 (e.g., at a sensor or the like) and produce navigation data. The propulsion components may, for example as controlled by the controller, propel and navigate the spacecraft 110 proximate the target satellite 102 in accordance with the navigation data.

The spacecraft 110 further includes a satellite capture subsystem 114 configured to selectively capture and release the target satellite 102. The satellite capture subsystem 114 includes one or more capture components, such as, but not limited to, one or more robotic arms, claws, tethers or the like to capture the target satellite 102. In other examples, the satellite capture subsystem 114 can further include one or more magnetic components configured to capture the target satellite 102 and hold the target satellite 102 in place during the control operation. Other suitable capture components are also contemplated.

The satellite capture subsystem 114 further includes a control medium applicator configured to apply a control medium 116 to the target satellite 102. The control medium 116 includes an electrically conducting and/or magnetic material. The electrically conducting and/or magnetic material can be, for example, a reactive metal compound such as a nano-thermite or a micro-thermite. In particular, the nano- or micro-thermite includes an oxidizer and a reducing agent (e.g. a metal and a metal oxide). The nano- or micro-thermites are configured to be ignited, for example, via induction and/or energized via induction to induce eddy currents and/or hysteresis in the nano- or micro-thermites, which in turn induce a reaction with each other, thereby releasing energy. In other examples, the nano- or micro-thermites may be ignited by other sources, such as remotely via laser beams, microwave beams, sunlight or other electromagnetic radiation. More generally, the electrically conducting and/or magnetic material can include solids and/or various types of fluids (including liquids, gases, combinations, and the like) containing electrically conducting particles or components.

The electrically conducting particles or components can be ignited to energize and/or heat the control medium 116 for controlling the target satellite 102. Accordingly, certain components of the electrically conducting and/or magnetic material may be selected to have a reaction ignition at or below a Curie temperature of the material. Thus, the electrically conducting and/or magnetic material may be energized to its reaction ignition point to combust and/or sinter the electrically conducting and/or magnetic material. For example, the electrically conducting and/or magnetic material can include reactive metal compounds, compounds in gaseous state, in liquid state, in solid state, a slurry of materials involving multiple phases and states, synthetic and non-synthetic polymers, or the like. The electrically conducting and/or magnetic material can further include a mixture of layers of materials, multi-coated metals with metamaterials, hybrid mixtures of reactive metal compounds in liquid and inert states, or other suitable combinations of materials.

In some examples, such as the one depicted in FIG. 1, the control medium 116 can include a supplementary module 117 having a layer 118 of electrically conducting and/or magnetic material. The supplementary module 117 may be configured to adhere to the target satellite 102. In such examples, the control medium applicator may be a robotic arm or the like to apply the supplementary module 117 to the target satellite 102.

The system 100 further includes an energization assembly 120 configured to energize the control medium 116. In particular, the energization assembly is configured to energize the electrically conducting and/or magnetic material to release energy for controlling the target satellite 102. In some examples, the energization assembly 120 may be disposed in the spacecraft 110. In other examples, the energization assembly 120 may be disposed in the control medium 116 itself. In further examples, the energization assembly 120 may be remote from the system 100, such as on another spacecraft or on earth.

In operation, the propulsion subsystem 112 is configured to maneuver the spacecraft 110 proximate the target satellite 102. For example, the propulsion subsystem 112 may utilize one or more sensors or detectors to localize the target satellite 102 and may use its engine to propel the spacecraft 110 towards the target satellite. The propulsion subsystem 112 may further maneuver the spacecraft 110 such that the satellite capture subsystem 114 is oriented towards the target satellite 102.

Figure 2:
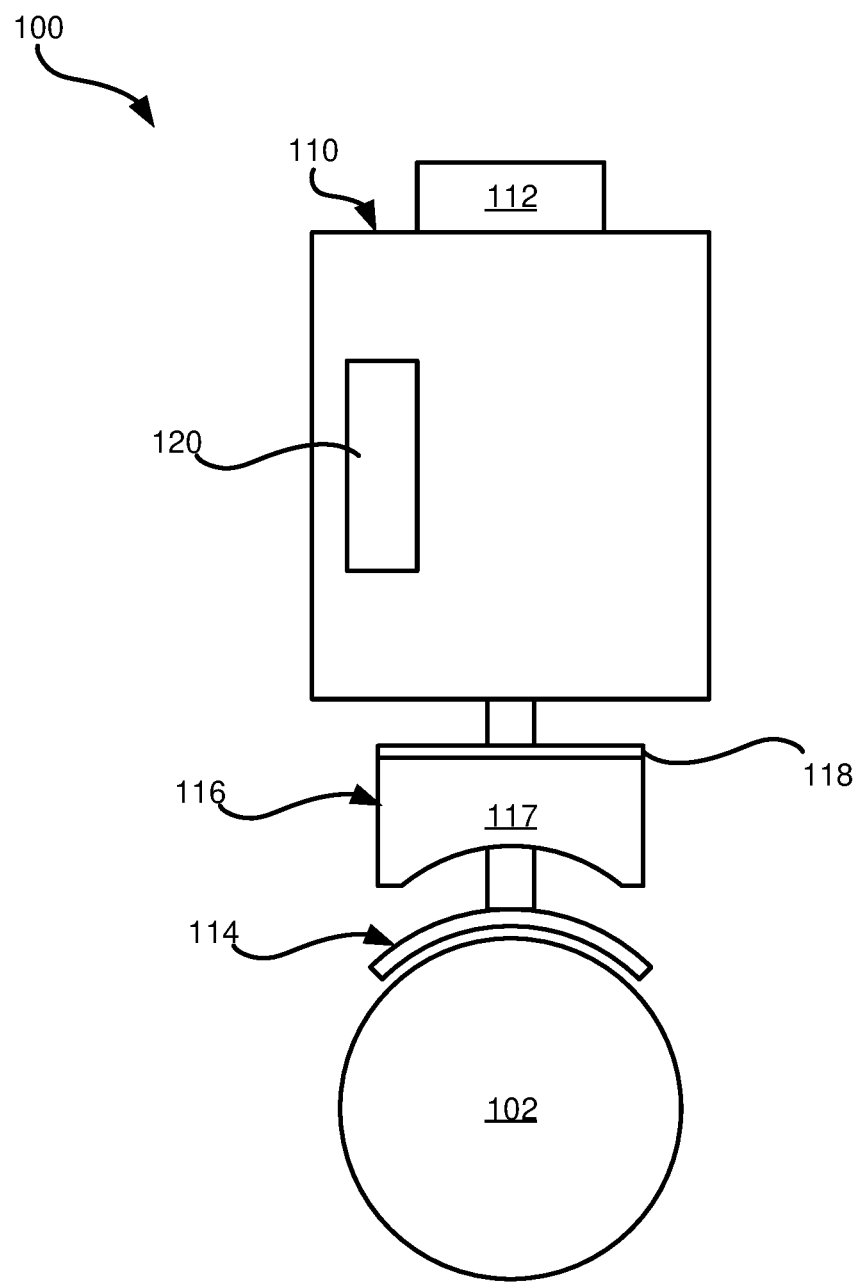
FIG. 2 shows a schematic of a satellite capture subsystem having captured a target satellite in the system of FIG. 1.

When the spacecraft 110 is in place, the satellite capture subsystem 114 is configured to capture the target satellite 102. For example, referring to FIG. 2, the spacecraft 110 is depicted with the satellite capture subsystem 114 having captured the target satellite 102. The satellite capture subsystem 114 may use one or more of: a robotic arm, magnetic components, tethered systems, mesh or the like to capture the target satellite 102.

Figure 3:
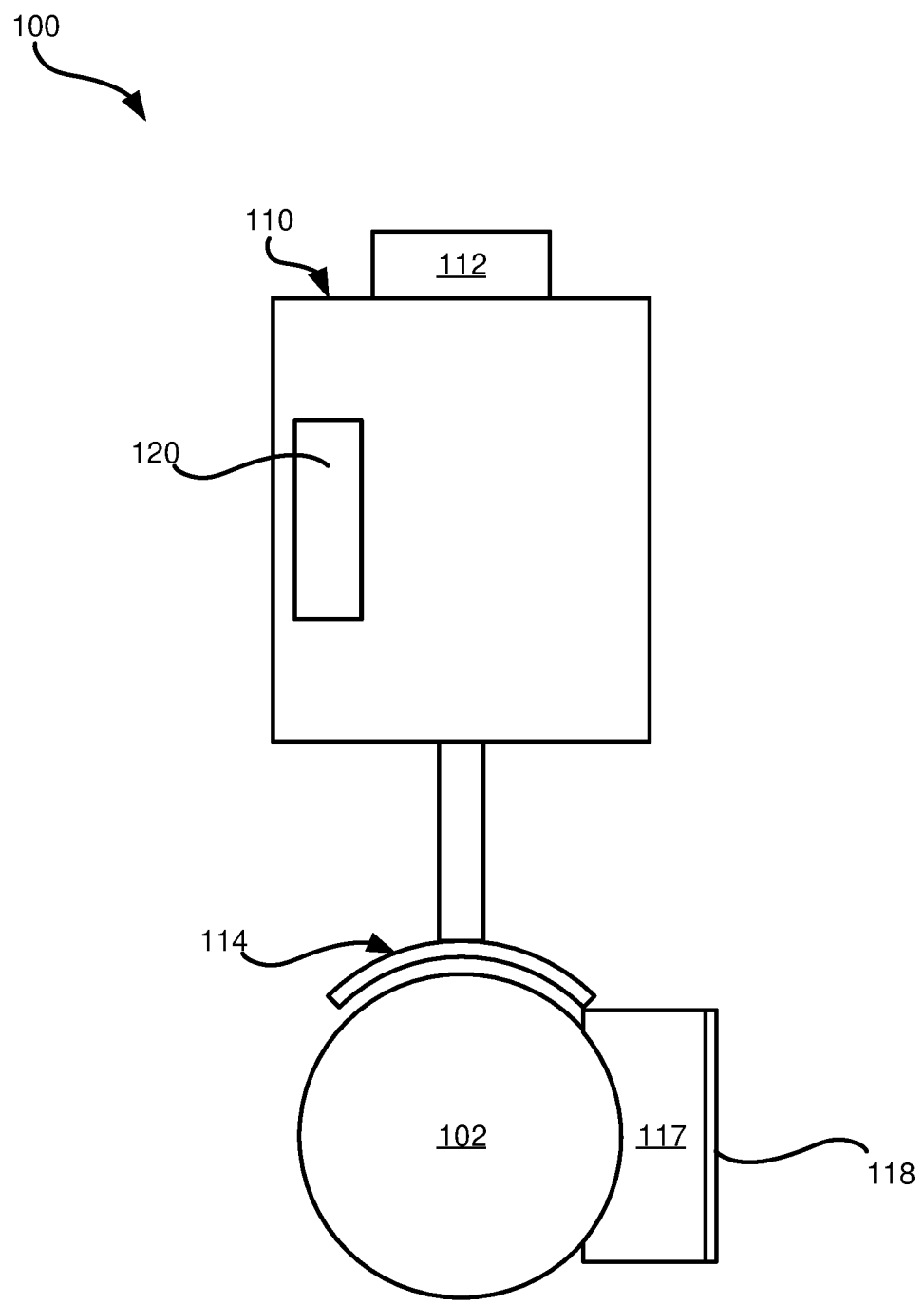
FIG. 3 shows a schematic of the satellite capture subsystem having adhered a supplementary module to the target satellite.

Having captured the target satellite 102, the satellite capture subsystem 114 is configured to apply the control medium 116 to the target satellite 102. For example, referring to FIG. 3, the supplementary module 117 is adhered to the target satellite 102. For example, the satellite capture subsystem 114 may use one or more additional robotic arms to adhere the supplementary module 117 to the target satellite 102. The supplementary module 117 may be adhered to the target satellite 102 by one or more adhesives, for example, as applied by the satellite capture subsystem 114 during the application of the control medium 116 to the target satellite 102. In other examples the adhesives may be pre-applied to the supplementary module 117 and may be activated, for example via contact with the target satellite 102, or by the satellite capture subsystem 114 during application of the control medium to the target satellite 102. In further examples, the supplementary module 117 may be adhered to the target satellite 102 via fasteners or other mechanical means.

In some examples, the satellite capture subsystem 114 may include a supplementary module generator (not shown) configured to print or otherwise manufacture the supplementary module 117. The supplementary module generator may include one or more detecting devices, such as imaging devices (e.g., color cameras, IR cameras, or the like), depth sensors, scanners, or other suitable devices to determine a shape of the target satellite 102, or a target region of the target satellite 102 onto which the supplementary module 117 is to be applied. The supplementary module generator may generate a model of the target satellite or the target region and a model of a supplementary module which conforms to the target satellite or target region. The supplementary module generator also include a printer, such as a 3D printer, to print the supplementary module 117 according to the model. Thus, the supplementary module 117 may be shaped to conform to the target satellite 102.

In other examples, the shape of the target satellite or target region of the satellite may be known, and the supplementary module 117 may be prefabricated (e.g., prior to launching the spacecraft 100).

Figure 4:
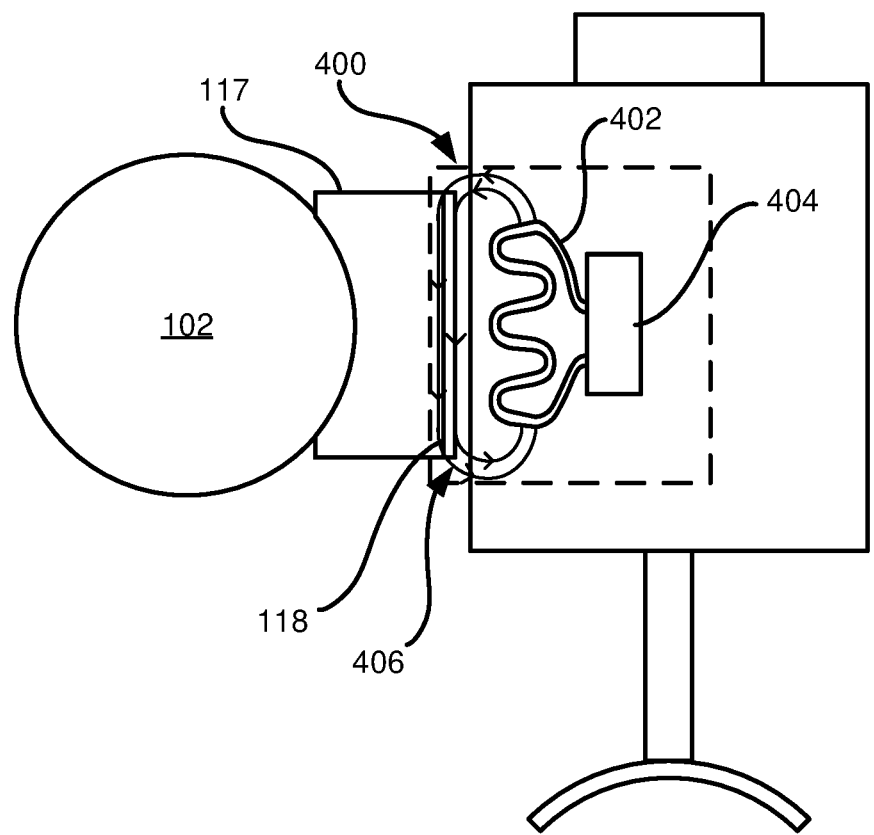
FIG. 4 shows a schematic of an energization assembly of the satellite-control spacecraft energizing an electrically conducting and/or magnetic material of the supplementary module.

When the control medium 116 has been applied to the target satellite 102, the satellite capture subsystem 114 is configured to release the target satellite 102 together with the control medium 116. The energization assembly 120 is then configured to energize the control medium 116, and in particular, the electrically conducting and/or magnetic material to release energy for controlling the target satellite 102. For example, referring to FIG. 4, the energization assembly 120 may be disposed in the spacecraft 110 and may include an induction heating assembly 400.

The induction heating assembly 400 includes a coil 402 and a power supplying circuit 404. In particular, the coil 402 is configured to be oriented adjacent the electrically conducting and/or magnetic material of the control medium 116. For example, the coil 402 is oriented adjacent the layer 118 of electrically conducting and/or magnetic material of the supplementary module 117. In particular, the propulsion subsystem 112 may be configured to move the spacecraft 110 such that the energization assembly 120 is aligned with the layer 118 of the supplementary module 117. The power supplying circuit 404 is configured to pass a current through the coil 402. For example, the power supplying circuit 404 may be an electronic oscillator or other suitable circuitry for passing a high-frequency alternating current through the coil 402. In accordance with Ampere's law, the current flowing through the coil 402 induces a magnetic field 406 around the coil 402. In some implementations, the power supplying circuit 404 is configured to vary the current passing through the coil 402, thereby varying the magnetic field 406. In other implementations, the coil 402 may be configured to move to vary the magnetic field 406 (e.g. via a positioning mechanism or other mechanical means). In accordance with Faraday's Law of Induction, the varying magnetic field 406 induces eddy currents and/or hysteresis in nearby conductors, and in particular, in the layer 118 of electrically conducting and/or magnetic material. The eddy currents and/or hysteresis, in turn, energize and ignite the electrically conducting and/or magnetic material thereby releasing energy for controlling the target satellite 102. Thus the layer 118 may be configured to have a specific ignition profile (e.g. by using different electrically conducting and/or magnetic materials in different combinations or spatial configurations) to allow for specific control of the target satellite 102.

Figure 5:
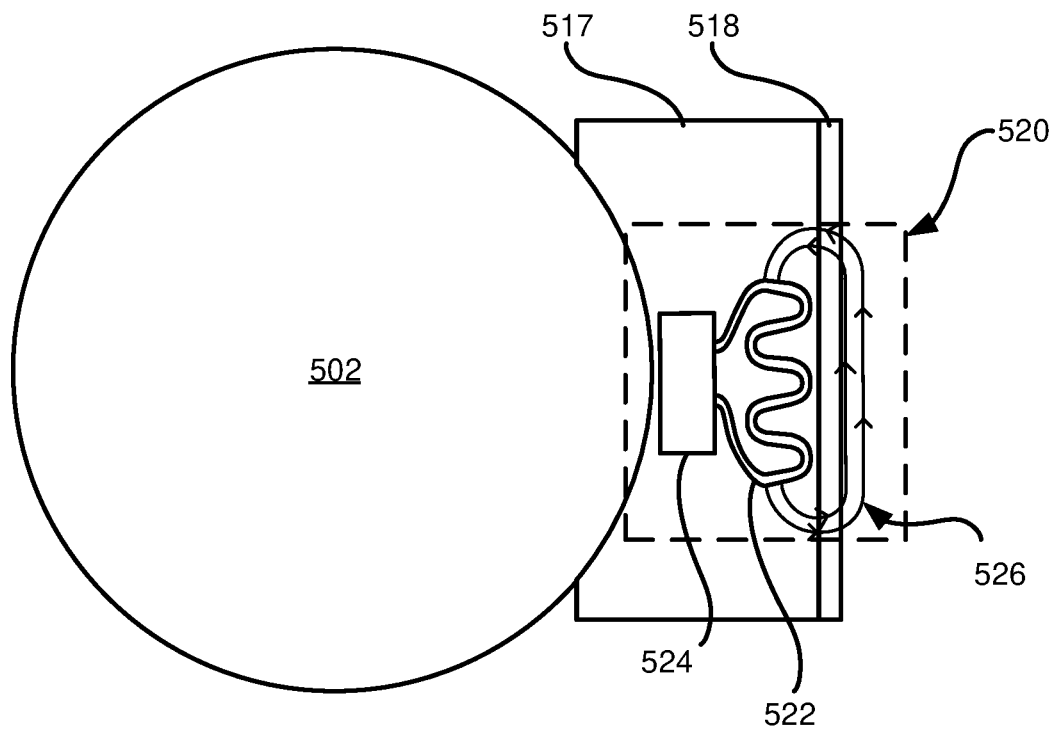
FIG. 5 shows a schematic of an energization assembly of the supplementary module energizing the electrically conducting and/or magnetic material.

In further implementations, the energization assembly need not be disposed in the spacecraft. For example, referring to FIG. 5, an example target satellite 502 having a supplementary module 517 adhered thereto is depicted. The supplementary module 517 includes a layer 518 of electrically conducting and/or magnetic material. Further, an energization assembly is disposed in the supplementary module 517. The energization assembly includes an induction heating assembly 520, which is similar to the induction heating assembly 400. The energization assembly may further include a processor or controller (not shown) to control the operation of the induction heating assembly 520, and hence the energization of the electrically conducting and/or magnetic material. The induction heating assembly 520 includes a coil 522 oriented adjacent the layer 518 of electrically conducting and/or magnetic material, and a power supplying circuit 524. The power supplying circuit 524 is configured to pass a current through the coil 522, thereby inducing a magnetic field 526. In some implementations, the power supplying circuit 524 may vary the current passing through the coil 522, while in other implementations, the coil 522 may move (e.g. parallel to the plane of the layer 518) to vary the magnetic field 526. The varying magnetic field 526 induces eddy currents in the layer 518 of electrically conducting and/or magnetic material, igniting the electrically conducting and/or magnetic material, thereby releasing energy for controlling the target satellite 502. The layer 518 may similarly be configured to have a specific ignition profile (e.g. by using different electrically conducting and/or magnetic materials in different combinations or spatial configurations) to allow for specific control of the target satellite 502.

Figure 6:
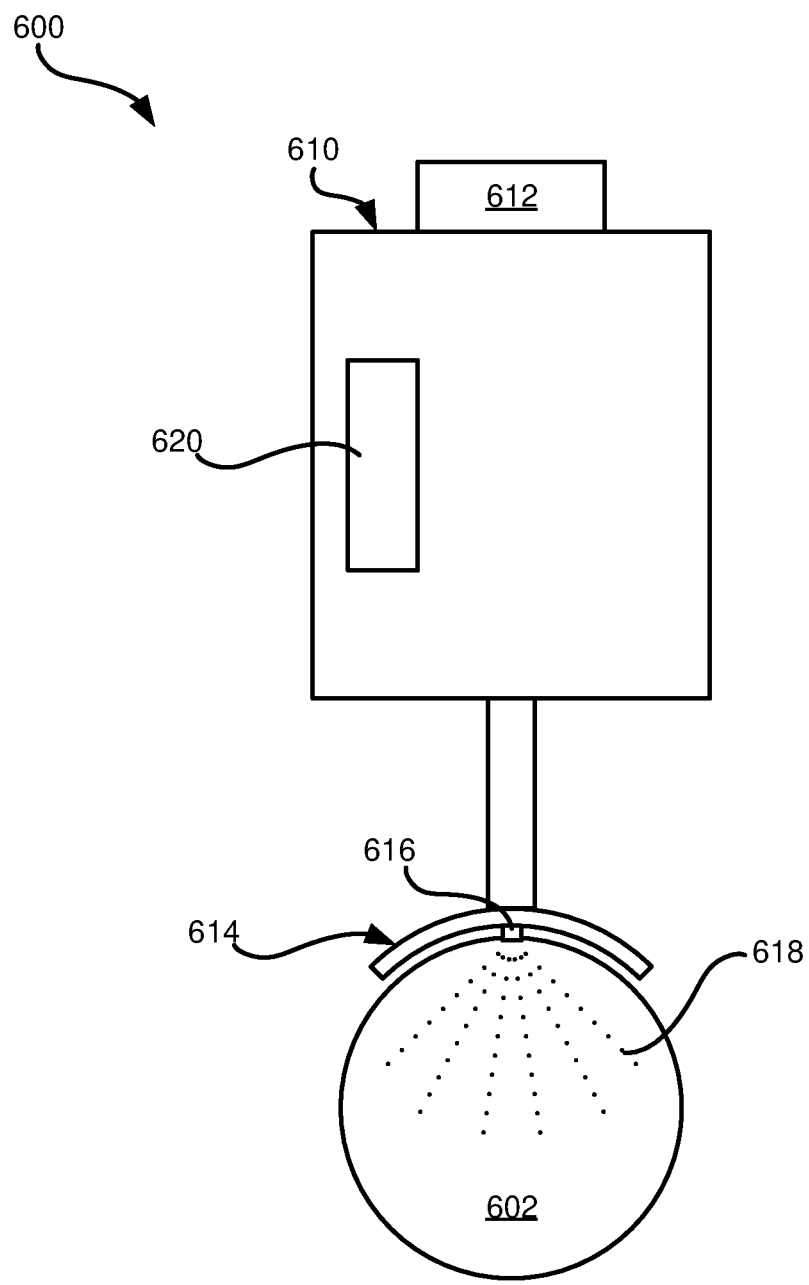
FIG. 6 shows a schematic of the satellite capture system applying dispersed particulate matter to the target satellite.

Referring now to FIG. 6, an example system 600 for controlling a target satellite is depicted. The system 600 is similar to the system 100, and includes a satellite-control spacecraft 610 including a propulsion subsystem 612 configured to propel and navigate the spacecraft 610, a satellite capture subsystem 614 configured to selectively capture and release the target satellite 602 and apply a control medium to the target satellite 602, the control medium including an electrically conducting and/or magnetic material. In particular, in the present example, the control medium includes a dispersed particulate matter 618 configured to be sprayed onto the target satellite 602. The satellite capture subsystem 614 may therefore include a nozzle 616 as the control medium applicator. The nozzle 616 is configured to spray the particulate matter 618 onto the target satellite. The nozzle 616 may be interconnected with a container (not shown) housed in the spacecraft 610 containing the particulate matter 618. The particulate matter 618 can include nano-energetic composites, reactive metal compounds, or other electrically conducting and/or magnetic material or combinations of materials suitable for being sprayed as particulate matter. The particulate matter 618 may be energized, for example by an energization assembly 620 housed in the spacecraft 610. In particular, the particulate matter 618 releases energy for controlling the target satellite 602.

In other examples, the control medium applicator may be configured to apply a supplementary module and to spray the particulate matter 618 onto the supplementary module. For example, alternatively to or in addition to the supplementary module including a layer of electrically conducting and/or magnetic material, the particulate matter 618 may be sprayed onto the supplementary module. In some examples, the control medium applicator may apply the supplementary module onto the target satellite 602, and then spray the dispersed particulate matter 618 onto the supplementary module using the nozzle 616.

In other examples, the satellite capture subsystem 614 may include a supplementary module generator (not shown), as described above, configured to print or otherwise manufacture a supplementary module for adhering to the target satellite 602 and integrating the particulate matter 618. That is, the supplementary module may be manufactured by the supplementary module generator. Subsequently, the supplementary module generator may apply the particulate matter 618 to the supplementary module and adhere the supplementary module with the integrated particulate matter 618 to the target satellite 602.

Figure 7:
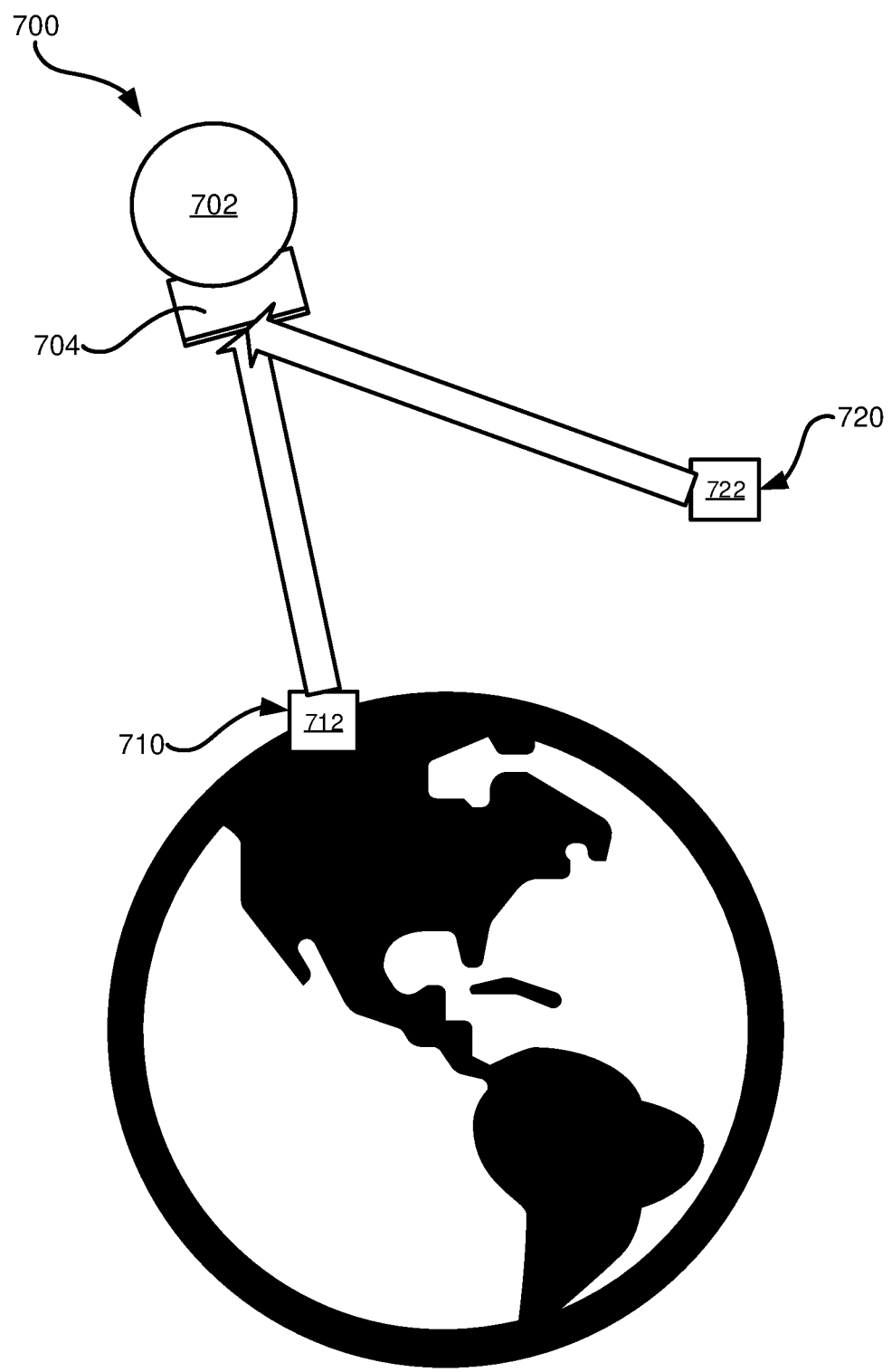
FIG. 7 shows a schematic of remote energization assemblies for remotely energizing the electrically conducting and/or magnetic material.

In other implementations, the energization assembly may be remote from the target satellite and may remotely energize the control medium. For example, referring to FIG. 7, an example system 700 for controlling a target satellite 702 is depicted. The system 700 includes remote energization assemblies 710 and 720 for remotely energizing a control medium 704 coupled to the target satellite 702. The energization assembly 710 is located on earth and includes a power transmitter 712. The power transmitter 712 can include a laser configured to emit laser beams to remotely energize the control medium 704. In other examples, the power transmitter 712 can include a microwave emitter configured to emit microwave beams to remotely energize the control medium 704. In further examples, the power transmitter 712 can include a reflector configured to reflect sunlight towards the control medium 704 to remotely energize the control medium 704.

The energization assembly 720 is located in space (e.g. on another satellite or a spacecraft) remote from the target satellite 702 and includes a respective power transmitter 722. The power transmitter 722 can include a laser configured to emit laser beams to remotely energize the control medium 704. In other examples, the power transmitter 722 can include a microwave emitter configured to emit microwave beams to remotely energize the control medium 704. In further examples, the power transmitter 722 can include a reflector configured to reflect sunlight towards the control medium 704 to remotely energize the control medium 704.

Figure 8:
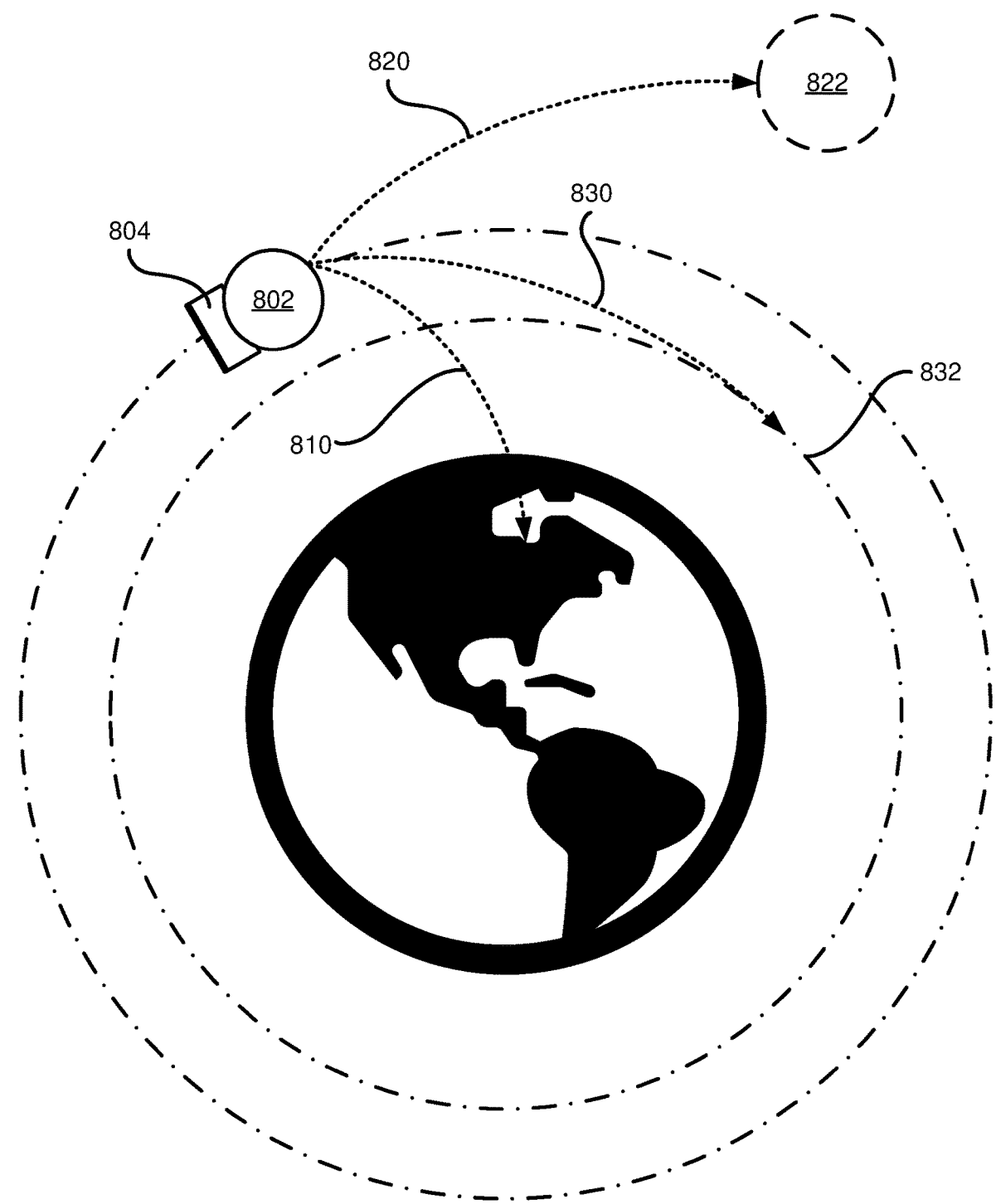
FIG. 8 shows a schematic of control paths of the target satellite.

Referring now to FIG. 8, different control paths of a target satellite 802 having a control medium 804 is depicted. In an example, the control medium 804 may be energized to release energy for de-orbiting the target satellite 802. In particular, the target satellite 802 follows a first path 810 to return the satellite to earth, thereby de-orbiting the target satellite 802. In another example, the control medium 804 may be energized to release energy for moving the target satellite 802 to a pre-designated area 822. In particular, the target satellite 802 follows a second path 820 to the pre-designated area 822. In a further example, the control medium 804 may be energized to release energy for propelling the target satellite 802 to a new orbit 832 to extend the lifetime of the target satellite 802. In particular, the target satellite 802 follows a third path 830 to the new orbit 832.

Figure 9:
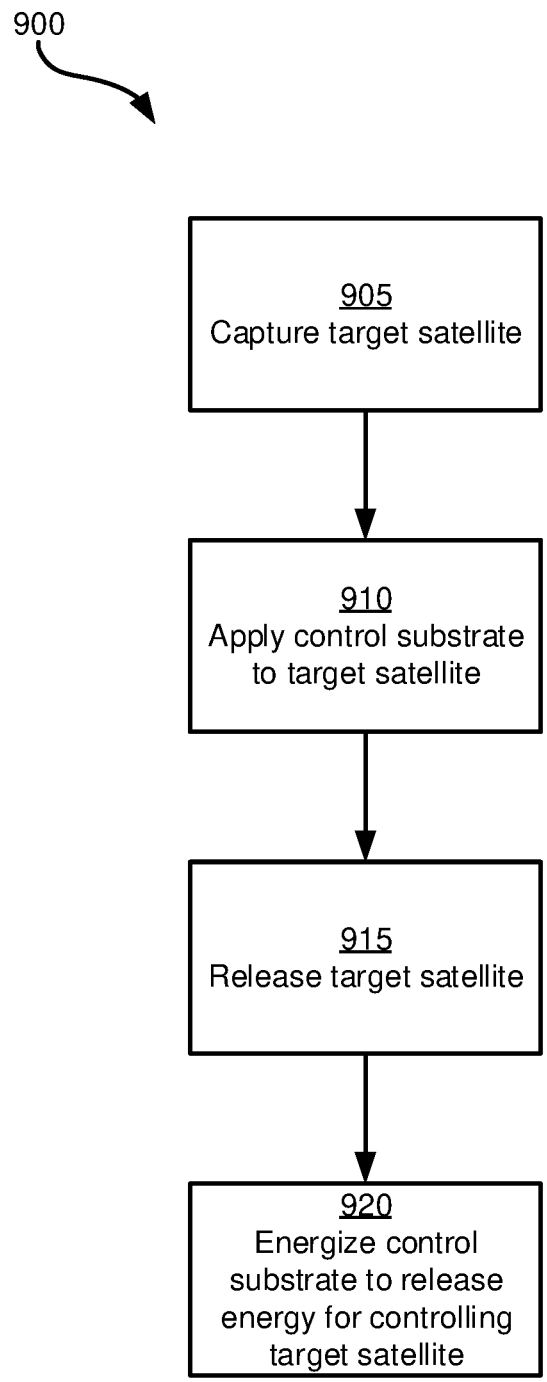
FIG. 9 depicts a method of controlling and providing motility to a target satellite in space.

Referring now to FIG. 9, a flowchart of an example method 900 of controlling a target satellite is depicted.

At block 905, a satellite-control spacecraft captures the target satellite. In particular, the satellite-control spacecraft may employ a propulsion system including an engine, one or more navigation components, and one or more means of detecting the target satellite to move the satellite-control spacecraft proximate the target satellite. The satellite-control spacecraft may further employ a satellite-capture subsystem including one or more robotic arms, claws, magnetic components, tethers, mesh and the like, to capture the target satellite.

At block 910, the satellite-control spacecraft applies a control medium to the target satellite. In particular, the control medium includes an electrically conducting and/or magnetic material. For example, the electrically conducting and/or magnetic material can include one or more of: a reactive metal compound in solid or liquid state; a reactive metal compound in gaseous state; a polymer; a thermoplastic; a multi-coated metal with metamaterials; and a nano-energetic material. The satellite-control spacecraft may employ the satellite-capture subsystem to apply the control medium to the target satellite.

For example, the control medium may be a supplementary module adhered to the target satellite. In some examples, the supplementary module may be prefabricated and/or shaped to conform to the target satellite. In some examples, the satellite-capture subsystem may scan the target satellite and generate a supplementary module conforming to the shape of the target satellite based on the scan data. In some examples, the control medium may be particulate matter configured to be sprayed onto the target satellite. In still further examples, the control medium may include combinations of the above, or other suitable control media.

At block 915, the satellite-control spacecraft releases the target satellite and the control medium coupled to the target satellite. More particularly, the satellite-capture subsystem may release the target satellite.

At block 920, an energization assembly energizes the control medium to release energy for controlling the target satellite. In some examples, the energization assembly may energize the control medium to release energy for de-orbiting the target satellite. In other examples, the energization assembly may energize the control medium to release energy for moving the target satellite to a pre-designated area. In further examples, the energization assembly may energize the control medium to release energy for propelling the target satellite to a new orbit to extend a lifetime of the target satellite. In further examples, the energization assembly may energize the control medium to release energy for propelling the target satellite to a new orbit to deorbit the target satellite.

The energization assembly may include an induction heating assembly configured to energize the control medium via induction heating. Accordingly, the energization assembly may energize the control medium by orienting a coil of the induction heating assembly adjacent the electrically conducting and/or magnetic material of the control medium and passing a current through the coil for generating a magnetic field to inductively heat the control medium to energize the control medium. In some examples, certain components of the electrically conducting and/or magnetic material may be selected to have a reaction ignition at or below a Curie temperature of the material. Thus, the electrically conducting and/or magnetic material may be energized to its reaction ignition point to combust the electrically conducting and/or magnetic material. Accordingly, energizing the control medium may include energizing the electrically conducting and/or magnetic material of the control medium to the reaction ignition point to combust the electrically conducting and/or magnetic material.

In other examples, the energization assembly may remotely energize the control medium via a power transmitter. For example, remotely energizing the control medium may include emitting laser beams to remotely energize the control medium. In other examples, remotely energizing the control medium may include emitting microwave beams to remotely energize the control medium. In further examples, remotely energizing the control medium may include controlling a reflector to remotely energize the control medium. In other examples, remotely energizing the control medium may include other electromagnetic radiation (e.g. low frequencies, infrared, ultraviolet, x-rays, gamma rays, terahertz or the like) to remotely energize the control medium.

In further examples, the control medium can be pre-applied to the target satellite during the manufacturing process. That is, the target satellite may be launched with a control medium to allow the satellite-control spacecraft to energize the control medium for controlling the target satellite after some predetermined period of time has passed.

Figure 10:
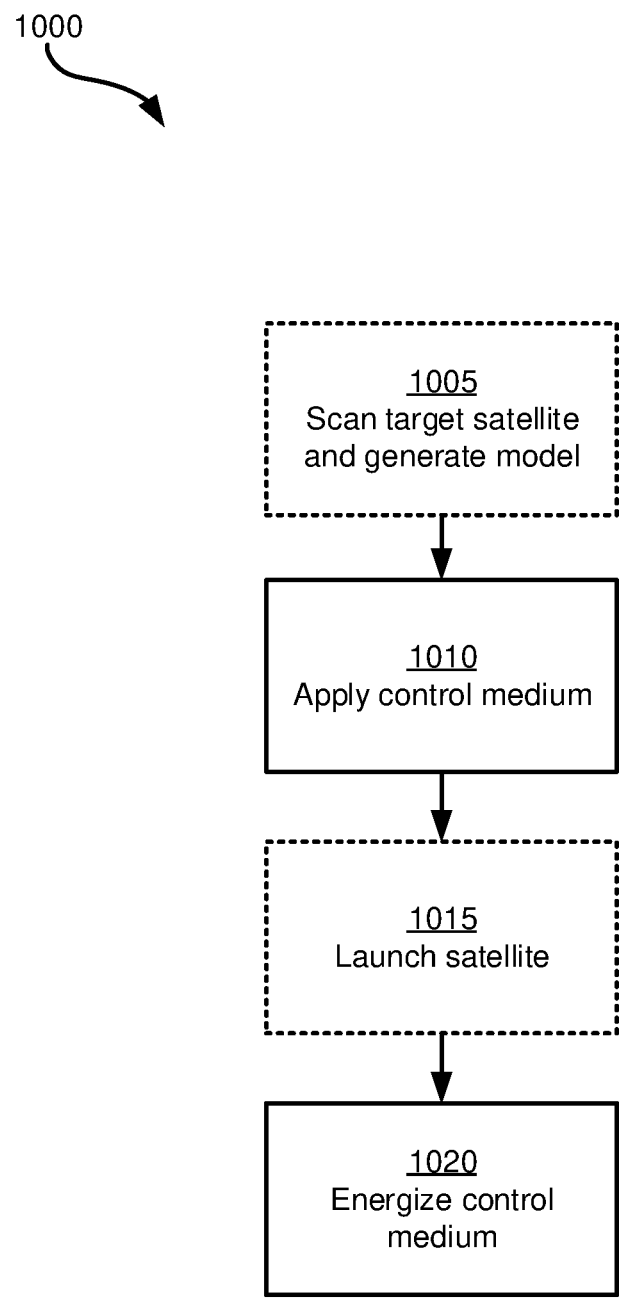
FIG. 10 depicts a method of applying a control medium to a target satellite.

Referring to FIG. 10, an example method 1000 of controlling a target satellite

Optionally, at block 1005, the target satellite may be scanned and a model may be generated representing the target satellite. In some examples, a target region (e.g., for adhesion of a control medium) may be scanned, rather than scanning the entire target satellite. A target region may be utilized based, for example, on a size of the target satellite. The operations at block 1005 may be performed, for example, prior to launching the target satellite into orbit, or while the target satellite is in orbit, for example by a satellite-control spacecraft as described above.

At block 1010, a control medium is applied to the target satellite. For example, the control medium may be sprayed on. In other examples, the model representing the target satellite or target region may be utilized to generate a supplementary module including a control medium which conforms to the shape of the target satellite or target region. The supplementary module may then be applied (e.g., by adhering, fastening, or otherwise securing the supplementary module) to the target satellite at the target region.

Optionally, at block 1015, the target satellite may be launched into space for orbit. Specifically, block 1015 may be performed when the control medium is applied to the target satellite prior to launch.

At block 1020, the control medium is energized. In some examples, it may first be determined whether a predetermined period of time has passed. For example, the supplementary module may include controller including a clocking device to track the passage of time. When the predetermined period of time has passed, the supplementary module may initiate inductive heating of the control medium to energize and combust the control medium. In other examples, the passage of time may be tracked by an operator (e.g., a human operator or an automated tracker outside of the supplementary module).

Such tracking of time may allow a satellite to orbit for a predetermined period of time, and then energize the control medium to change the orbit of the target satellite. For example, the target satellite may be de-orbited and return to earth after the predetermined period of time, or may be controlled to enter a different orbit for a further period of time.

In still further examples, multiple control mediums may be applied to a target satellite to be activated at different times in order to control the movement of the target satellite. Further, the electrically conducting and/or magnetic material of the control medium may be selected to have a specific ignition profile to control the target satellite in a specific manner. In particular, certain components of the electrically conducting and/or magnetic material may be selected to have a reaction ignition point at or below a Curie temperature so that the electrically conducting and/or magnetic material may be combusted to allow for the specific control.

The scope of the claims should not be limited by the embodiments set forth in the above examples, but should be given the broadest interpretation consistent with the description as a whole.

The invention claimed is:

1. A system for controlling a target satellite, the system comprising:
  a satellite-control spacecraft including:
    a propulsion subsystem configured to propel and navigate the spacecraft proximate the target satellite; and
    a satellite-capture subsystem configured to:
      capture the target satellite;
      apply a control medium to the target satellite, the control medium including an electrically conducting and/or magnetic material; and
      release the target satellite; and
  an energization assembly configured to energize the control medium to release energy for controlling the target satellite, wherein energizing the control medium comprises energizing the electrically conducting or magnetic material of the control medium to a reaction ignition point to combust and/or sinter the electrically conducting or magnetic material.

2. The system of claim 1, wherein the control medium comprises particulate matter configured to be sprayed onto the target satellite.

3. The system of claim 1, wherein the energization assembly is disposed in the spacecraft.

4. The system of claim 1, wherein the energization assembly comprises an induction heating assembly including a coil configured to be oriented adjacent the electrically conducting and/or magnetic material of the control medium, a power supplying circuit coupled to the coil to pass an alternating current through the coil for generating a magnetic field to inductively heat the control medium for controlling the target satellite.

5. The system of claim 1, wherein the energization assembly comprises a power transmitter configured to remotely energize the control medium.

6. The system of claim 5, wherein the power transmitter comprises one or more of: a laser, a microwave emitter, an electromagnetic radiation emitter, and a reflector.

7. The system of claim 1, wherein the electrically conducting and/or magnetic material further comprises one or more of: a nano-thermite or micro-thermite material in solid or liquid state; a nano-thermite or micro-thermite material in gaseous state; a polymer; a thermoplastic; a micro-energetic material; a multi-coated metal with metamaterials; and
  a nano-energetic material.

8. The system of claim 7, wherein at least one component of the electrically conducting and/or magnetic material is selected to have a reaction ignition point at or below a Curie temperature of the material to sinter the electrically conducting and/or magnetic material.

9. The system of claim 1, wherein the control medium comprises a supplementary module configured to adhere to the target satellite.

10. The system of claim 9, wherein the supplementary module is shaped to conform to the target satellite.

11. The system of claim 9, wherein the satellite-capture subsystem further comprises a substrate printer configured to manufacture the supplementary module.

12. The system of claim 9, wherein the energization assembly is disposed in the supplementary module.

13. A method of controlling a target satellite, the method comprising:
  capturing, by a satellite-control spacecraft, the target satellite;
  applying, by the satellite-control spacecraft, a control medium to the target satellite, the control medium including an electrically conducting and/or magnetic material;
  releasing, by the satellite-control spacecraft, the target satellite; and
  energizing, by an energization assembly, the control medium to release energy for controlling the target satellite, wherein energizing the control medium comprises energizing the electrically conducting or magnetic material of the control medium to a reaction ignition point to combust and/or sinter the electrically conducting or magnetic material.

14. The method of claim 13, wherein energizing the control medium comprises energizing the control medium to release energy for de-orbiting the target satellite.

15. The method of claim 13, wherein energizing the control medium comprises energizing the control medium to release energy for moving the target satellite to a pre-designated area.

16. The method of claim 13, wherein energizing the control medium comprises energizing the control medium to release energy for propelling the target satellite to a new orbit to extend a lifetime of the target satellite.

17. The method of claim 13, wherein applying the control medium comprises spraying dispersed particulate matter onto the target satellite.

18. The method of claim 13, wherein energizing the control medium comprises:
   orienting a coil of the energization assembly adjacent the electrically conducting and/or magnetic material of the control medium; and
   passing an alternating current through the coil for generating a magnetic field to inductively heat the control medium to energize the control medium for controlling the target satellite.

19. The method of claim 13, wherein applying the control medium comprises adhering a supplementary module to the target satellite.

20. The method of claim 19, further comprising, prior to capturing the target satellite, pre-fabricating the supplementary module to conform to the target satellite.

21. The method of claim 13, wherein energizing the control medium comprises remotely energizing, by a power transmitter, the control medium.

22. The method of claim 21, wherein remotely energizing the control medium comprises one or more of: emitting laser beams to remotely energize the control medium, emitting microwave beams to remotely energize the control medium, emitting other electromagnetic radiation to remotely energize the control medium, and controlling a reflector to reflect sunlight to remotely energize the control medium.

23. The method of claim 13, wherein the electrically conducting and/or magnetic material further comprises one or more of: a nano-thermite or micro-thermite material in solid or liquid state; a nano-thermite or micro-thermite material in gaseous state; a polymer; a thermoplastic; a micro-energetic material; a multi-coated metal with metamaterials; and nano-energetic materials.

24. The method of claim 23, wherein at least one component of the electrically conducting and/or magnetic material is selected to have a reaction ignition point at or below a Curie temperature of the material to sinter the electrically conducting and/or magnetic material.

25. A method of controlling a target satellite, the method comprising:
   pre-applying a control medium to the target satellite, the control medium including an electrically conducting and/or magnetic material;
   launching the target satellite; and
   energizing, by an energization assembly, the control medium to release energy for controlling the target satellite, wherein energizing the control medium comprises energizing the electrically conducting or magnetic material of the control medium to a reaction ignition point to combust and/or sinter the electrically conducting or magnetic material.

* * * * *